Feb. 18, 1964   V. A. BAKER   3,121,422
VACUUM REGULATED HIGH COMPRESSION ENGINE
Filed Jan. 10, 1962   2 Sheets-Sheet 1

INVENTOR.
VANCE A. BAKER
BY *Robert E Breidenthal*
ATTORNEY

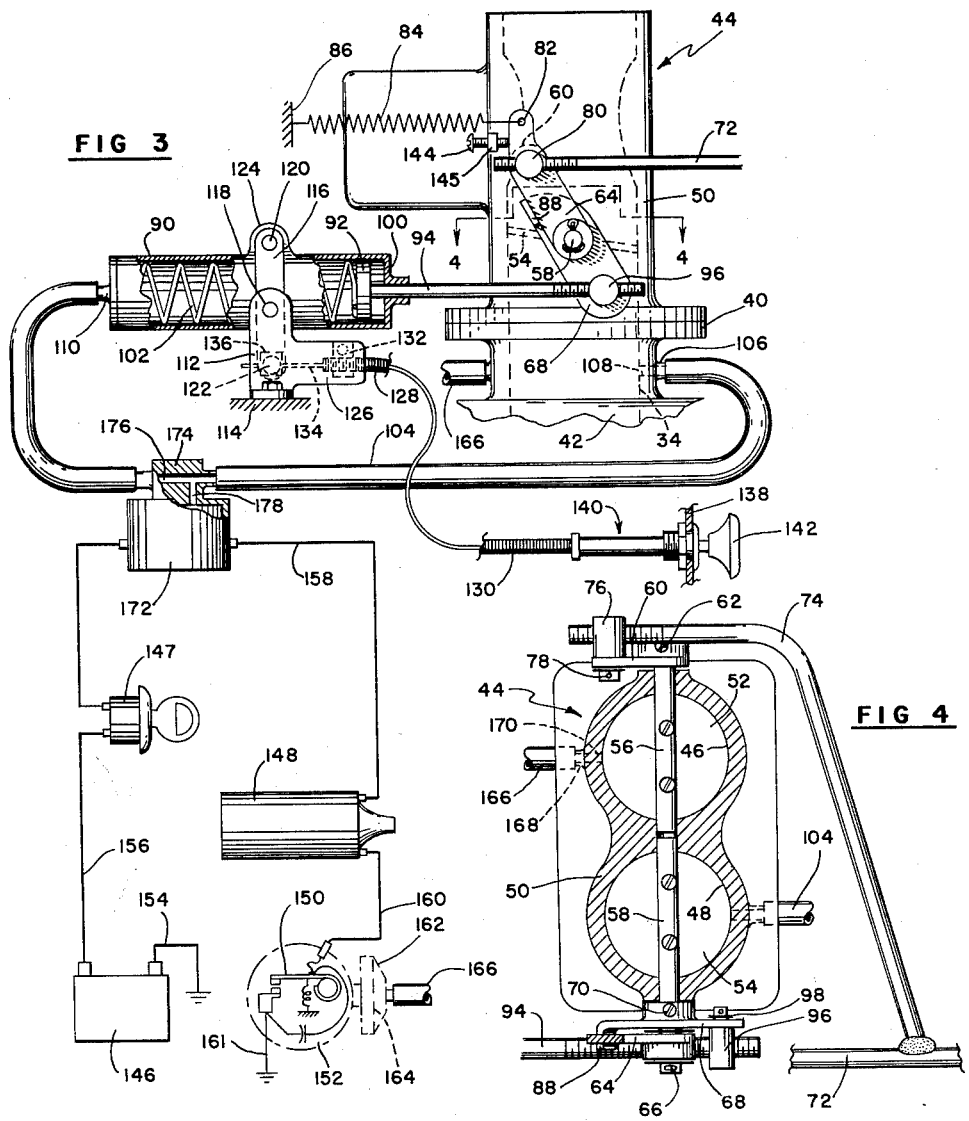

ated Feb. 18, 1964

3,121,422
VACUUM REGULATED HIGH COMPRESSION
ENGINE
Vance A. Baker, Box 465, Norfolk, Nebr., assignor of sixty percent to Charles H. Baker, Wichita, Kans.
Filed Jan. 10, 1962, Ser. No. 165,380
13 Claims. (Cl. 123—52)

This invention relates to new and useful improvements in internal-combusition engines of the multi-cylinder type, and more particularly pertains to the control of the ignition system and the supply of fuel mixture to the cylinders of such an engine wherein the cylinders have differing compression ratios.

With respect to internal-combusion engines of the piston-type (either two- or four-stroke cycle) that burn gasoline or similar fuel, and which require an ignition system for producing a combusion-initiating spark in each cylinder for the power stroke, it is known that the ratio of power output to fuel consumption rate of a cylinder tends to increase with the compression ratio of such cylinder short of such compression ratio being so high as to cause substantial detonation or knock with the particular fuel mixture being used. This fact is evidenced by continued efforts to produce fuels of ever increasing anti-knock characteristics on the part of fuel manufacturers, and the corresponding trend of engine manufacturers to produce engines of higher compression ratios to take advantage of available fuel capabilities, while restricting the compression ratios to values that avoid detonation and obtain smooth engine performance during low engine speed operation and during engine acceleration.

Restricting the compression ratio of an engine to a compromise value that facilitates engine starting and which avoids detonation during low engine speeds and which in particular avoids detonation during engine acceleration (especially with wide-open throttle at low to moderate engine speeds) represents a compromise that entails a loss of the efficiencies that could be realized during moderate and high speed engine operation at a relatively constant speed or load condition on the use of a higher compression ratio.

It is a purpose of this invention to provide a multi-cylinder engine of the class defined above that will preserve in large measure the favorable starting, low speed and acceleration characteristics of conventional engines having a compromised compression ratio (in the sense of being restricted as indicated above), and which will in large measure obtain the advantages of a substantially higher compression ratio engine during moderate and high engine speed operation.

Another object of the invention, in accordance with the above-stated purpose, is to provide an engine that will achieve concurrently the advantages of relatively high and low compression ratios at all engine speeds, so that the benefiits peculiar to each compression ratio are available in some degree in any phase of engine operation.

Still another object of the invention is to provide an engine that will achieve concurrently the advantages of relatively high and low compression ratios by independently controlling the supply of fuel mixture to cylinders of differing compression ratios in a manner applicable to engines having cylinders all operating on either a four-stroke or a two-stroke cycle, or mixed engines having some cylinders operating on a four-stroke cycle and the other cylinders operating on a two-stroke cycle.

Yet another object of the invention, is to provide an internal-combustion engine of the class requiring an ignition system for initiating fuel combustion in which the ignition system is disabled when the fuel mixture is introduced into the cylinders at a pressure conducive to detonation in the cylinders.

The present invention is somewhat related to my Patent No. 2,911,078, entitled Engine Throttle Control System, issued November 3, 1959, and realizes with respect to the relatively higher compression ratio cylinder some of the fuel economy advantages set forth in the patent.

Broadly speaking, the invention relates to an improvement in an internal-combustion engine of the multi-cylinder type, such improvement comprising said engine having a primary set of one or more power cylinders and a secondary set of one or more power cylinders, each of said secondary power cylinders having a higher compression ratio than any of the first set of power cylinders, separate primary and secondary intake manifolds for the primary and secondary sets of power cylinders respectively with each of said manifolds having a fuel mixture inlet and independent primary and secondary valve means for controlling the inlets of the primary and secondary manifolds respectively.

Another aspect of the invention relates to an improvement in an internal-combustion engine of the multi-cylinder type, such improvement comprising said engine having at least one primary cylinder and at least one secondary cylinder, said secondary cylinder having a higher compression ratio that the primary cylinder, separate primary and secondary intake manifolds connected respectively to the primary and secondary cylinders, said primary and secondary intake manifolds having fuel mixture inlets provided respectively with primary and secondary throttle valves, means enabling operator actuation of the primary throttle valve, means for yieldingly urging closure of the secondary throttle valve, and vacuum-actuated means connected to the secondary intake manifold for urging opening of the secondary throttle valve. The invention may also optionally involve the provision of means for limiting the opening of the secondary throttle valve to an extent determined by the exent that the primary throttle valve is opened. Optionally, but preferably, the invention also involves the provision of remotely operable mechanical means for varying the bias of the means for yieldingly urging closure of the secondary throttle valve.

A version of the invention involves an improvement in an internal-combustion engine of the multi-cylinder type, such improvement comprising said engine having at least one primary cylinder and at least one secondary cylinder, said secondary cylinder having a higher compression ratio than the primary cylinder, separate primary and secondary intake manifolds connected respectively to the primary and secondary cylinders, said primary and secondary intake manifolds having fuel mixture inlets provided respectively with primary and secondary throttle valves, means enabling operator actuation of the primary throttle valve, means for yieldingly urging closure of the secondary throttle valve, vacuum-actuated means connected to the secondary intake manifold for urging opening of the secondary throttle valve, said engine having an ignition system, and vacuum-actuated means connected to the secondary intake manifold for disabling the ignition system upon the vacuum in the secondary intake manifold being less than a predetermined value.

Other objects, features and advantages of the invention will become apparent upon reference to the accompanying drawings in the light of the following description thereof, wherein:

FIGURE 3 is a side elevational view on an enlarged scale of the carburetion and throttle valve control system of the engine shown in FIGURES 1 and 2, with the associated ignition control system being shown diagrammatically; and, FIGURE 4 is a partial horizontal sectional view on an enlarged scale of the structure shown in FIGURE 3 taken on the plane of the broken section line 4—4 of FIGURE 3.

Figure 1:
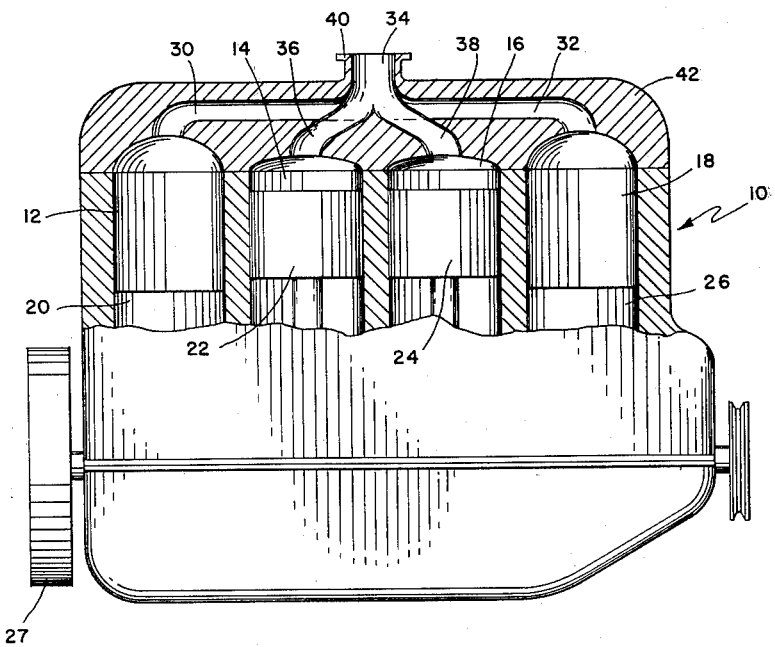
FIGURE 1 is a side elevational view of an engine according to the invention with parts (valves and carburetor and ignition systems) not shown, and partly in section to illustrate the separate intake manifolds and the cylinders having differing head clearance and correspondingly differing compression ratios.
Figure 2:
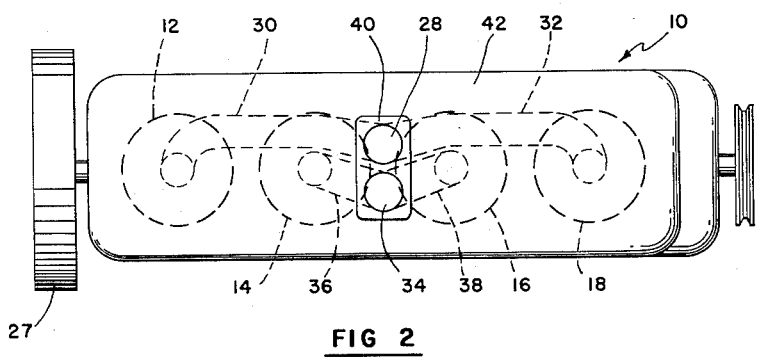
FIGURE 2 is a top plan view of the engine shown in FIGURE 1, with the cylinders and the intake manifolds being shown in dashed outline.

Referring now to the drawings, wherein like numerals designate like parts throughout the various views, the numeral 10 designates generally an engine block (the valves, exhaust system, carburetion system, and ignition system not being shown), provided with power cylinders 12, 14, 16 and 18. The cylinders 12, 14, 16 and 18 are provided respectively with pistons 20, 22, 24 and 26 that are operatively connected in the conventional manner to a crankshaft, not shown, having a fly wheel 27.

The cylinders 12 and 18 constitute a primary set of cylinders, and the cylinders 14 and 16 constitute a secondary set of cylinders. The secondary set of cylinders 14 and 16 together with their associated pistons 22 and 24 have a substantially higher compression ratio than the primary set of cylinders 12 and 18 in association with their respective pistons 20 and 26. In the engine 10 illustrated, such differences in the compression ratios of the primary and secondary sets of cylinders are obtained by the cylinders 14 and 16 having a substantially lesser head clearance than the cylinders 12 and 18, as shown, it being understood that the strokes of the pistons 20, 22, 24 and 26 are of equal length. Though the illustrated form of the engine 10 shows the differing compression ratios accomplished by the various cylinders having differing head clearances, it is not essential that such differing compression ratios be realized in such manner, as such differing compression ratios can be accomplished by the pistons 22 and 24 having greater stroke lengths than the pistons 20 and 26, such as on the pistons 22 and 24 operating on greater crank throws. It is only essential that the secondary set of cylinders 14 and 16 have higher compression ratios than the primary set of cylinders 12 and 18, and such differing compression ratios can be realized by providing lesser head clearance for the cylinders 14 and 16 and/or providing greater crank throws for the pistons 22 and 24, as will be readily understood by those skilled in the art.

Separate primary and secondary intake manifolds are provided for the primary and secondary sets of cylinders, respectively. The primary intake manifold comprises an inlet passageway 28 having lateral branches 30 and 32 communicating through conventional cylinder inlet valves, not shown, with the cylinders 12 and 18. The secondary intake manifold comprises an inlet passageway 34 having lateral branches 36 and 38 communicating through conventional cylinder inlet valves, not shown, with cylinders 14 and 16. The inlet passageways 28 and 34 open upwardly through a flanged upward extension 40 on the head structure 42 of the engine 10.

Attention is now directed to FIGURES 3 and 4 for an understanding of the means for controlling the passage of a fuel mixture through the inlet passageways 28 and 34 of the intake manifolds.

A carburetor designated generally at 44 is mounted on the flanged extension 40, as shown, such carburetor 44 being dual throated and including a pair of passageways 46 and 48 in the body 50 of the carburetor 44 that communicate respectively with and constitute continuations of the inlet passageways 28 and 34. Primary and secondary throttle valves 52 and 54 of the butterfly-type are mounted in the passageways 46 and 48, respectively, on aligned shafts 56 and 58 that are journaled in the body 50 of the carburetor 44.

A primary actuating arm 60 is fixed on a projecting end of the shaft 56 in a selectable angular relationship by a set screw 62. A secondary arm 64 is journaled for free rotation or oscillation on a projecting end of the shaft 58, and is retained on the latter by a cotter pin 66. An actuating arm 68 is fixed on the shaft 58 intermediate the carburetor body 50 and the arm 64 in selectable angular relationship by a set screw 70.

A throttle control rod 72 is provided that is adapted by conventional means, not shown, for operator actuation (as by a conventional automobile accelerator pedal, not shown) from a remote position, such control rod 72 having an offset and parallel lateral branch 74. Adjustably threaded upon the extremity of the control rod branch 74 is a pivot member 76 that is journaled in the upper end portion of the arm 60 and releasably retained therein by the pin 78, whereby reciprocation of the control rod 72 causes oscillation of the shaft 56 and corresponding opening and closing movement of the valve 52 secured to the shaft 56. In a similar manner, a pivot member 80 is adjustably threaded upon the extremity of the control rod 72, such pivot member 80 being journaled and releasably retained in the upper end portion of the arm 64, whereby the hereinbefore mentioned reciprocation of the control rod 72 causes oscillation of the arm 64 about the axis of the shaft 58.

As shown in FIGURE 3, the upper end portion of the arm 64 has an opening 82 therethrough. A coiled tension spring 84 has one end anchored to a suitable support 86 fixed in position relative to the engine 10, and has its other end secured to the arm 64 through the opening 82, whereby the spring 84 yieldingly urges the arm 64 in a counterclockwise direction, as viewed in FIGURE 3. Such counterclockwise motion of the arm 64 causes movement of the control rod 72 and its branch 74 to the left with the result that the arm 60 urges closing movement of the throttle valve 52.

As shown in FIGURE 3, the arm 68 has upwardly and downwardly extending portions, with the upper portion thereof being provided with an ear 88 disposed in the travel path of the arm 64, whereby clockwise rotation or oscillation of the arm 68 that corresponds to opening movement of the valve 54 is limited to an extent determined by the position of the arm 64. Accordingly, the extent to which the valve 54 is opened is limited to the extent that the valve 52 is opened. Though the provision of the ear 88 on the arm 68 is much preferred, it can if desired or deemed expedient be omitted. In any event, it will be appreciated that, subject to a hereinafter described control means for the valve 54, the operation of the valve 54 is entirely independent of the operation of the valve 52 except for the function of the ear 88 when the latter is provided. It is in this sense that the operation of the valve 54 can be stated to be independent of the operation of the valve 52.

Control means is provided for the valve 54. Such control means comprise a cylinder 90 fitted with a piston 92 having a piston rod 94 fixed thereto that projects from one end of the cylinder 90. Adjustably threaded upon the free end of the piston rod 94 is a pivot member 96 that is journaled through the lower portion of the arm 68 and releasably secured therein by a pin 98. As shown, the end of the cylinder 90 through which the piston rod 94 projects is closed and is provided with a vent 100 to atmospheric pressure. The end of the cylinder 90 remote from the vent 100 is also closed, and a coiled compression spring 102 is disposed in the cylinder 90 and seated between such end of the cylinder 90 and the piston 92 in an arrangement that yieldingly urges the piston rod 94 outwardly from the cylinder 90 with a force that varies linearly in relation to the position of the piston 92 in the cylinder 90. Conduit means is provided to afford pressure or fluid communication between the inlet passageway 34 of the secondary intake manifold and the interior of the cylinder 90 remote from the vent 100. Such conduit means comprises a hose 104 having one end secured to a boss or nipple 106 on the extension 40, such boss 106 having an opening 108 therethrough that communicates with the inlet passageway 34. The other end of the hose 104 is secured to a boss or nipple 110 on the end of the cylinder 90 remote from the vent 100, such boss 110 having an opening, not shown, therethrough communicating with the interior of the cylinder 90.

Means is provided for mounting the cylinder 90 in a position adjustable toward and away from the shaft 58. Such means comprises an upstanding U-shaped bracket 112 securely mounted upon a suitable support 114 that is fixed in position with respect to the engine 10. Upstanding links 116 are disposed within and centrally pivoted at 118 to the bracket 112 in parallel and spaced relation to each other. Though the bracket 112 and the links 116 are shown in side elevation, it will be understood that each of the links 116 has a separate pivot 118. The links 116 are retained in parallel relationship by a pin 120 connecting their upper extremities and a pin 122 connecting their lower extremities. The cylinder 90 is disposed in a generally horizontal position between the links 116 and in a position overlying the pin 122. The pin 120 is journaled through an upstanding apertured lug 124 formed on the top of the cylinder 90 intermediate its ends. The arrangement is such that pivotal motion of the links 116 about their pivots 118 causes motion of the cylinder 90 toward and away from the shaft 58, it being understood that the center of gravity of the cylinder 90 and the parts carried thereby being disposed below the pin 120 tends to maintain the cylinder 90 in a generally horizontal position.

Means is provided for enabling an operator to adjust manually and releasably secure the links 116 in a selected position from a remote location. Such means comprises one side of the bracket 112 being provided with a horizontal extension 126 to which one end of the housing 128 of a flexible Bowden control cable 130 is clamped as indicated at 132. The free end of the control wire 134 of the Bowden cable 130 is fixed by means, not shown, to a block 136 journaled on an end of the pin 122. The arrangement is such that reciprocation of the control wire 134 in the housing 128 of the Bowden cable 130 actuates pivotal or oscillatory movement of the links 116 so as to actuate movement of the cylinder 90 toward and away from the shaft 58. The end of the Bowden cable 130 remote from the bracket 112 is securely mounted in a conventional manner on a suitable support 138 that is fixed in position relative to the engine 10. Assuming the engine 10 is used as the prime mover of an automobile, for example, the support 138 can conveniently be the dashboard or instrument panel of the automobile. As is conventional in Bowden cable control installations, means 140 for mounting the control cable 130 on the dashboard 138 includes a manually operable control knob 142 that is connected to the control wire 134 through the dashboard 138, such knob 142 being reciprocable to reciprocate the control wire 134 in the housing 128 and being releasably lockable in a selected position by twisting the same.

Means is provided for adjustably controlling the idling speed of the engine 10 which comprises an idling adjustment screw 144 threaded through an ear 145 on the carburetor body 50. The screw 144 is disposed so as to project to an adjustable extent into the travel path of the upper end portion of the arm 64 so as to constitute an adjustable stop that limits counterclockwise movement of the arm 64 and corresponding closure of the primary throttle valve 52. It will be apparent when the throttle valve 52 is in idling position as determined by the arm 64 contacting the screw 144 that the maximum opening of the throttle valve 54 is limited to a predetermined idling position relative to the throttle valve 52 by the hereinbefore described coaction of the arm 64 and the ear 88 on the arm 68.

The engine 10 is provided with a conventional electrical ignition system partly shown in FIGURE 3 for providing combustion initiating spark to the cylinders 12, 14, 16 and 18 in a cyclic manner. Such electrical ignition system includes in electrical series, as is conventional, a storage battery 146, a key-operated ignition switch 147, the primary winding of an ignition coil 148, and the breaker switch 150 of a conventional distributor 152. The electrical series circuit of the elements 146, 147, 148 and 150 is completed by electrical conductors 154, 156, 158, 160 and 161. The distributor 152 is entirely conventional and as is customary is provided with means 162 including a diaphram 164 that is vacuum-actuated to control the spark advance of the distributor 152. The vacuum-actuated means 162 is connected to be controlled in response to the vacuum prevailing in the inlet passageway 28 of the primary intake manifold. The structure of such connection comprises a hose 166 having one end connected to the vacuum-actuated means 162 and its other end connected to a boss or nipple 168 on the extension 40, said boss having an opening 170 therethrough that communicates with the inlet passageway 28.

Optionally, though preferably, means is provided for disabling the electrical ignition system of the engine 10 whenever the absolute pressure prevailing within the inlet passageway 34 of the secondary intake manifold is in excess of a predetermined subatmospheric pressure. Such optional means preferably takes the form of means for opening the electrical series circuit of the elements 146, 147, 148 and 150 upon the vacuum in the inlet passageway 34 being less than a predetermined value. Such means comprises a pressure-sensitive electric switch 172 interposed in the electrical conductor 158 so as to be in series with the switch 147. The switch 172 is connected to the hose 104 for actuation. The pressure-sensitive switch 172 includes a head structure 174 having a passageway 176 extending therethrough, with the hose 104 being formed in two parts with the adjacent ends fixed to the head structure 174 so that the passageway 176 communicates between the two parts of the hose 104. The head structure 174 is provided with a passageway 178 that communicates between the passageway 176 and the conventional pressure-sensitive components, not shown, of the pressure-sensitive switch 172. It will be understood that basically the pressure-sensitive switch 172 is entirely conventional and includes switch contacts, not shown, that are normally open whenever the pressure communicated to the pressure-sensitive switch 172 through the passageway 178 is in excess of a predetermined subatmospheric pressure, with the contacts being closed whenever the pressure within the passageway 178 has an absolute value less than the predetermined value.

Neglecting the function of the means for disabling the electrical ignition system, it will be noted that the operation and control of the primary set of cylinders 12 and 18 is conventional as to the control of the rate of fuel mixture admission thereto and as to the supply of ignition thereto, it being noted that the spark advance means 164 of the distributor 152 is controlled by the vacuum prevailing within the associated primary intake manifold. The primary set of cylinders 12 and 18 have typical or standard compression ratios preferably sufficiently low as to prevent substantial detonation during conditions of extreme engine acceleration, and may with respect to commercially available gasoline fuels available at the present time have, for example, in the case of four-stroke cycle engines compression ratios in the range of about 8:1 to about 10:1. The compression ratio of the secondary set of cylinders 14 and 16 is substantially higher than the compression ratio of the primary set of cylinders 12 and 18, such secondary set of cylinders 14 and 16 having, by way of example, a compression ratio in excess of 12:1 and preferably about 16:1 or higher.

When, as in the case of the illustrated engine 10, the number of cylinders in the primary and secondary sets of cylinders are equal, the firing order is such that cylinders of the primary and secondary sets of cylinders fire alternately. In the case of the illustrated engine 10, cylinders 12, 16, 18, and 14 fire in sequence. It will be appreciated that such symmetrical firing sequence of the two sets of cylinders contributes to the smoothness of engine operation inasmuch as the power delivered by cylinders of the two sets of cylinders will ordinarily vary with respect to each other during different conditions of engine operation. Though the illustrated engine has its cylinders in line and of equal diameters, such is not necessarily the case as the engine can have cylinders of differing diameters and the cylinders can have any desired angular relationship, such as in V or 180° opposed relation. Then too, the engine can include any desired number of cylinders.

Also, either of the two sets of cylinders (primary and secondary) can consist of one or more cylinders (with the total number of engine cylinders being distributable in the two sets in any desired proportion suited to preferred operating characteristics), and the cylinder or cylinders of either set can operate on either a two-stroke or four-stroke cycle. If either set of cylinders includes two or more cylinders, some of such set of cylinders can operate on a four-stroke cycle and the others can operate on a two-stroke cycle. As will be clear to those skilled in the art, the term "cylinder" as used in this context refers to the cylinder together with related gear determinative of its mode (four- or two-stroke cycle) of operation.

During engine operation, the spring 102 acting through the piston rod 94 and the arm 68 tends to yieldingly urge closure of the valve 54, with the vacuum prevailing within the inlet passageway 34 tending to oppose the action of the spring 102. The bias of the spring 102 is adjustably controlled through manual operation of the control knob 142. The arrangement is such that the throttle valve 54 is automatically controlled so as to make the vacuum prevailing within the inlet passageway 34 tend toward a constant value determined by the adjusted position of the control knob 142. By way of example, the arrangement can be such that the pressure in the inlet passageway 34 will tend toward a selectable value determined by the position of the knob 142 in the range of about 16 to about 20 inches or higher of mercury vacuum. However, overriding such automatic actuation of the position of the valve 54 is the control exercised by the position of the throttle control rod 72 over the position of the valve 54 that occurs on engagement of the ear 88 with the arm 64. In the preferred construction which is especially well suited for automobile use wherein downward movement of an accelerator pedal, not shown, is such as to cause movement of the control rod 72 to the right as seen in FIGURE 3, the spring 84 is of sufficient strength to override torque applied to the arm 64 through the ear 88.

Though the valves 52 and 54 can be arranged so as to be open to an identical extent when the ear 88 engages the arm 64, this is not necessary, and any desired relationship can be accomplished by virtue of the adjustments afforded by the set screws 62 and 70, and by the pivot members 76, 80 and 96.

Inasmuch as present day fuels necessitate a fairly high vacuum in the secondary intake manifold in order to avoid detonation of the relatively high compression ratio secondary cylinders, say on the order of at least being substantially greater than 10 inches of mercury vacuum, the pressure-sensitive switch 172 can be such that the predetermined value at which the same is actuated to close can be on the order of about 10 inches of mercury vacuum. As a vacuum in the secondary intake manifold substantially less than 10 inches of mercury vacuum can result in extreme detonation and possible serious deleterious consequences for the engine, the provision of the means for disabling the electrical ignition system when the vacuum in the inlet passageway 34 is less than about 10 inches mercury vacuum will be readily apparent. The advantage of disabling the electrical ignition system when the vacuum in the inlet passageway 34 is low is of particular value during the starting of the engine 10 and also is of value in the event of a malfunction of the apparatus for automatically controlling the valve 54, such as could occur on the spring 102 breaking. It will be evident that the provision of the means for disabling the electrical ignition system requires the engine (on starting) to be turned over sufficiently to develop enough vacuum in the secondary intake manifold to actuate closure of the switch 172 before ignition is provided to any of the cylinders of the engine, thereby preventing possible engine damage. It is not essential that ignition for the primary cylinders be controlled by the switch 172, but since no harm comes from such control and since the expense of provision of a coordinated separate ignition system for the primary cylinders can be avoided by the use of a single distributor for both the primary and secondary cylinders, such simplified and relatively inexpensive organization is ordinarily preferred.

The secondary set of cylinders contributes relatively little power to the maximum engine power output as compared to the primary set of cylinders during low engine speed operation; however, the secondary set of cylinders contributes a progressively increasing proportion of the maximum engine power output as engine speed increases, and thereby affords substantial fuel economies during sustained engine operation at moderate and particularly at high speeds. During sustained periods of moderate and high speed engine operation, optimum advantage can be obtained from the high compression ratio of the secondary set of cylinders upon adjusting the bias of the spring 102 upon manipulation of the control knob 142 to such a value that the secondary set of cylinders are operating near or at the threshold of detonation. While the invention has been illustrated and described in connection with an engine of four cylinders, it will be manifest to those skilled in the art that the principles of the invention have applicability to multi-cylinder engines of a fewer or greater number of cylinders. Furthermore, while the invention has been illustrated and described in conjunction with an engine in which the cylinders are equally divided between the primary and secondary sets of cylinders, the invention is not to be construed as so-limited, as the number of secondary cylinders may be greater or fewer than the number of primary cylinders. In fact, it is not essential that the total of primary and secondary cylinders be even in number.

Not only is the illustrated and described embodiment of the invention representative of a particular engine falling within the hereinbefore indicated scope of choice as to engine design (the numbers of cylinders included in each set of cylinders and their mode of operation); but the illustrated and described embodiment of the invention is also representative of a particularly preferred class of multi-cylinder internal-combustion engines having a primary set of cylinders and a secondary set of cylinders of relatively higher compression ratio, wherein the effective number of cylinders in one of the sets of cylinders is an integral multiple (one or more) of the effective number of cylinders in the other set of cylinders, said cylinders of the two sets of cylinders having a firing order such that firings of cylinders of said one set of cylinders corresponding in number to the value of said integral factor occur intermediate successive firings of the cylinder or cylinders constituting said other set of cylinders, with the cylinders of each set firing in cyclic sequence. By "effective number of cylinders" is meant the number of cylinders obtained by counting each cylinder operating on a two-stroke cycle twice and each cylinder operating on a four-stroke cycle once, whereby cognizance can be given to the relative firing frequency of such two modes of operation in fixing a symmetrical overall engine firing sequence. Such preferred class of engines also includes, by way of example, a six-cylinder engine (all cylinders operating in the same mode—either four- or two-stroke cycle) having four cylinders constituting the primary set of cylinders and the other two cylinders constituting the secondary set of cylinders. The number of primary cylinders is an integral multiple (two) of the number of secondary cylinders, in which case two of the primary cylinders successively fire intermediate successive firings of the secondary cylinders.

Such preferred class of engines for application of the principles of the present invention thereto also includes by way of further example a three-cylinder engine with two cylinders (A and B) thereof operating on a four-stroke cycle and constituting one of the sets of cylinders, with the third cylinder (C) operating on a two-stroke cycle and constituting the other set of cylinders. As the effective number of cylinders in each set of cylinders is two, the integral multiple has a value of one. Therefore, in accordance with the preceding paragraph the cyclic firing order of the cyclinders is A—C—B—C.

Appropriate distributor design for any desired firing order is deemed well within the skill of the art, and elaboration is believed unnecessary and would only serve to obscure the essence of the instant invention.

While engine cylinder systems having or susceptible to having symmetrical firing orders such as described above are much preferred in the interest of smoothness of engine operation, etc., other factors can under some circumstances dominate such considerations without precluding realization of the advantages of the invention herein described (particularly when the diameters of cylinders of the two sets thereof are of markedly differing diameters, or when the engine is of very heavy design and employs a massive fly wheel), and accordingly, the application of the principles of the present invention concerning the control of fuel mixture to the primary and secondary intake manifolds and/or concerning the control of the ignition of the secondary set of cylinders is not necessarily restricted to engines having a symmetrical firing order.

The invention has been described in rather elaborate detail in order to convey a full and complete understanding of the principles involved and the field of their applicability, and a restricted scope of invention is not to be implied by such elaboration. The actual scope of the invention is to be ascertained on reference to the appended claims.

I claim:

1. In an internal-combustion engine of the multi-cylinder type, the improvement comprising said engine having at least one primary cylinder and at least one secondary cylinder, said secondary cylinder having a higher compression ratio than the primary cylinder, separate primary and secondary intake manifolds connected respectively to the primary and secondary cylinders, said primary and secondary intake manifolds having fuel mixture inlets provided respectively with primary and secondary throttle valves, means enabling operator actuation of the primary throttle valve, means for yieldingly urging closure of the secondary throttle valve, and vacuum-actuated means connected to the secondary intake manifold for urging opening of the secondary throttle valve.

2. In an internal-combustion engine of the multi-cylinder type, the improvement comprising said engine having at least one primary cylinder and at least one secondary cylinder, said secondary cylinder having a higher compression ratio than the primary cylinder, separate primary and secondary intake manifolds connected respectively to the primary and secondary cylinders, said primary and secondary intake manifolds having fuel mixture inlets provided respectively with primary and secondary throttle valves, means enabling operator actuation of the primary throttle valve, means for yieldingly urging closure of the secondary throttle valve, vacuum-actuated means connected to the secondary intake manifold for urging opening of the secondary throttle valve, and means for limiting the opening of the secondary throttle valve to an extent determined by the extent that the primary throttle valve is opened.

3. In an internal-combustion engine of the multi-cylinder type, the improvement comprising said engine having at least one primary cylinder and at least one secondary cylinder, said secondary cylinder having a higher compression ratio than the primary cylnider, separate primary and secondary intake manifolds connected respectively to the primary and secondary cylinders, said primary and secondary intake manifolds having fuel mixture inlets provided respectively with primary and secondary throttle valves, means enabling operator actuation of the primary throttle valve, means for yieldingly urging closure of the secondary throttle valve, vacuum-actuated means connected to the secondary intake manifold for urging opening of the secondary throttle valve, said engine having an ignition system, and vacuum-actuated means connected to the secondary intake manifold for disabling the ignition system upon the vacuum in the secondary intake manifold being less than a predetermined value.

4. In an internal-combustion engine of the multi-cylinder type, the improvement comprising said engine having at least one primary cylinder and at least one secondary cylinder, said secondary cylinder having a higher compression ratio than the primary cylinder, separate primary and secondary intake manifolds connected respectively to the primary and secondary cylinders, said primary and secondary intake manifolds having fuel mixture inlets provided respectively with primary and secondary throttle valves, means enabling operator actuation of the primary throttle valve, means for yieldingly urging closure of the secondary throttle valve, vacuum-actuated means connected to the secondary intake manifold for urging opening of the secondary throttle valve, means for limiting the opening of the secondary throttle valve to an extent determined by the extent that the primary throttle valve is opened, said engine having an ignition system, and vacuum-actuated means connected to the secondary intake manifold for disabling the ignition system upon the secondary intake manifold vacuum being less than a predetermined value.

5. In an internal-combustion engine of the multi-cylinder type, the improvement comprising said engine having at least one primary cylinder and at least one secondary cylinder, said secondary cylinder having a higher compression ratio than the primary cylinder, separate primary and secondary intake manifolds connected respectively to the primary and secondary cylinders, said primary and secondary intake manifolds having fuel mixture inlets provided respectively with primary and secondary throttle valves, means enabling operator actuation of the primary throttle valve, means for yieldingly urging closure of the secondary throttle valve, vacuum-actuated means connected to the secondary intake manifold for urging opening of the secondary throttle valve, said engine having an ignition system, vacuum-actuated means connected to the secondary intake manifold for disabling the ignition system upon the vacuum in the secondary intake manifold being less than a predetermined value, said ignition system including a distributor of the type having a vacuum-actuated spark advance, and said primary intake manifold being operatively connected to the distributor for vacuum actuation of the spark advance thereof.

6. In an internal-combustion engine of the multi-cylinder type, the improvement comprising said engine having at least one primary cylinder and at least one secondary cylinder, said secondary cylinder having a higher compression ratio than the primary cylinder, separate primary and secondary intake manifolds connected respectively to the primary and secondary cylinders, said primary and secondary intake manifolds having fuel mixture inlets provided respectively with primary and secondary throttle valves, means enabling operator actuation of the primary throttle valve, spring means for yieldingly urging closure of the secondary throttle valve, means for varying the bias of the spring means comprising a movable support for the spring means together with means for securing the support in a selected position, and vacuum-actuated means connected to the secondary intake manifold for urging opening of the secondary throttle valve.

7. In an internal-combustion engine of the multi-cylinder type, the improvement comprising said engine having at least one primary cylinder and at least one secondary cylinder, said secondary cylinder having a higher compression ratio than the primary cylinder, separate primary and secondary intake manifolds connected respectively to the primary and secondary cylinders, said primary and secondary manifolds each having a fuel mixture inlet passageway with such passageways being respectively provided with primary and secondary butterfly throttle valves, said primary and secondary throttle valves being respectively secured to separate and aligned pivot shafts that are mounted for angular movement about a common axis, a primary arm fixed to the primary shaft and a secondary arm journaled on the secondary shaft for pivotal movement about the common axis, means for actuating joint pivotal movement of the primary and secondary arms about the common axis, an actuating arm fixed to the secondary shaft, said secondary arm and said actuating arm being provided with means for limiting pivotal movement of the latter in a direction corresponding to opening movement of the secondary throttle valve relative to the secondary arm, spring means connected to the actuating arm for yieldingly urging pivotal movement of the latter in a direction corresponding to closing the secondary throttle valve, and vacuum-actuated means connected to the secondary intake manifold for urging pivotal movement of the actuating arm in a direction corresponding to opening movement of the secondary throttle valve.

8. In an internal-combustion engine of the multi-cylinder type, the improvement comprising said engine having at least one primary cylinder and at least one secondary cylinder, said secondary cylinder having a higher compression ratio than the primary cylinder, separate primary and secondary intake manifolds connected respectively to the primary and secondary cylinders, said primary and secondary manifolds each having a fuel mixture inlet passageway with such passageways being respectively provided with primary and secondary butterfly throttle valves, said primary and secondary throttle valves being respectively secured to separate and aligned pivot shafts that are mounted for angular movement about a common axis, a primary arm fixed to the primary shaft and a secondary arm journaled on the secondary shaft for pivotal movement about the common axis, means for actuating joint pivotal movement of the primary and secondary arms about the common axis, adjustable stop means for limiting closure of the primary throttle valve comprising an adjustment screw threadingly mounted to project a selectable extent along the travel path of one of said arms, an actuating arm fixed to the secondary shaft, said secondary arm and said actuating arm being provided with means for limiting pivotal movement of the latter in a direction corresponding to opening movement of the secondary throttle valve relative to the secondary arm, spring means connected to the actuating arm for yieldingly urging pivotal movement of the latter in a direction corresponding to closing the secondary throttle valve, and vacuum-actuated means connected to the secondary intake manifold for urging pivotal movement of the actuating arm in a direction corresponding to opening movement of the secondary throttle valve.

9. In an internal-combustion engine of the multi-cylinder type, the improvement comprising said engine having at least one primary cylinder and at least one secondary cylinder, said secondary cylinder having a higher compression ratio than the primary cylinder, separate primary and secondary intake manifolds connected respectively to the primary and secondary cylinders, said primary and secondary manifolds each having a fuel mixture inlet passageway with such passageways being respectively provided with primary and secondary butterfly throttle valves, said primary and secondary throttle valves being respectively secured to separate and aligned pivot shafts that are mounted for angular movement about a common axis, a primary arm fixed to the primary shaft and a secondary arm journaled on the secondary shaft for pivotal movement about the common axis, means for actuating joint pivotal movement of the primary and secondary arms about the common axis, an actuating arm fixed to the secondary shaft, said secondary arm and said actuating arm being provided with means for limiting pivotal movement of the latter in a direction corresponding to opening movement of the secondary throttle valve relative to the secondary arm, spring means connected to the actuating arm for yieldingly urging pivotal movement of the latter in a direction corresponding to closing the secondary throttle valve, vacuum-actuated means connected to the secondary intake manifold for urging pivotal movement of the actuating arm in a direction corresponding to opening movement of the secondary throttle valve, said engine having an ignition system, and vacuum-actuated means connected to the secondary intake manifold for disabling the ignition system upon the vacuum in the secondary intake manifold being less than a predetermined value.

10. The combination of claim 9, wherein said ignition system includes a distributor of the type having a vacuum-actuated spark advance, and said primary intake manifold being operatively connected to the distributor for vacuum actuation of the spark advance thereof.

11. In an internal-combustion engine of the multi-cylinder type, the improvement comprising said engine having a primary set of one or more power cylinders and a secondary set of one or more power cylinders, each of said secondary power cylinders having a higher compression ratio than any of the first set of power cylinders, separate primary and secondary intake manifolds for the primary and secondary sets of power cylinders respectively with each of said manifolds having a fuel mixture inlet, and independent primary and secondary valve means for controlling the inlets of the primary and secondary manifolds respectively.

12. The combination of claim 11, wherein the effective number of cylinders in one of the sets of cylinders is an integral multiple of the effective number of cylinders in the other set of cylinders, said cylinders of the two sets of cylinders having a firing order such that firings of cylinders of said one set of cylinders corresponding in number to the value of said integral factor occur intermediate successive firings of said other set of cylinders.

13. The combination of claim 11, wherein the secondary valve means includes pressure responsive control means therefor operatively connected to the secondary manifold.

References Cited in the file of this patent

UNITED STATES PATENTS

| | | |
|---|---|---|
| 1,461,339 | Wirrer | July 10, 1923 |
| 1,605,286 | Ruckstell | Nov. 2, 1926 |
| 2,162,174 | Jones | June 13, 1939 |
| 2,186,043 | Rohlin | Jan. 9, 1940 |
| 2,479,257 | Ramey | Aug. 16, 1949 |
| 2,766,314 | Murphy et al. | Oct. 9, 1956 |